United States Patent [19]
Hoshi

[11] Patent Number: 5,191,819
[45] Date of Patent: Mar. 9, 1993

[54] CUTTER ASSEMBLY FOR STRAND CUTTING MACHINE AND RESIN MATERIAL CUTTING ASSEMBLY

[75] Inventor: Tadaichi Hoshi, Tochigi, Japan
[73] Assignee: Kabushiki Kaisha Hoshi Plastic, Tochigi, Japan
[21] Appl. No.: 715,245
[22] Filed: Jun. 14, 1991
[30] Foreign Application Priority Data

Jun. 20, 1990 [JP] Japan .................................. 2-161978
Apr. 25, 1991 [JP] Japan .................................. 3-95089

[51] Int. Cl.⁵ .............................................. B26D 1/29
[52] U.S. Cl. ........................................ 83/349; 83/502; 83/508.3; 83/666; 83/675; 83/676
[58] Field of Search ................ 83/349, 508, 508.2, 83/508.3, 666, 675, 676, 404.3, 407, 408; 425/382.3, 316; 264/148; 30/346.55, 346.61, 357

[56] References Cited

U.S. PATENT DOCUMENTS

| | | | |
|---|---|---|---|
| 72,301 | 12/1867 | Ives | 83/675 |
| 902,636 | 11/1908 | Youmans | 83/675 |
| 2,119,405 | 5/1938 | Runcie | 30/346.61 |
| 2,327,943 | 8/1943 | Tiers et al. | |
| 2,482,523 | 9/1949 | Urschel et al. | |
| 2,555,214 | 5/1951 | Wallach et al. | 30/346.55 |
| 3,164,862 | 1/1965 | Zies | |
| 3,321,145 | 5/1967 | Gorman | 83/349 |
| 3,574,890 | 4/1971 | Gresch | |
| 3,600,745 | 8/1971 | Hench et al. | |
| 3,623,525 | 11/1971 | Kieves | 83/676 |
| 4,251,198 | 2/1981 | Aztenburg | 83/675 |
| 4,340,342 | 7/1982 | Kim | 425/316 |

FOREIGN PATENT DOCUMENTS

| | | |
|---|---|---|
| 0242313 | 10/1987 | European Pat. Off. . |
| 0462887A1 | 12/1991 | European Pat. Off. . |
| 3126550A1 | 7/1982 | Fed. Rep. of Germany . |
| 87151410 | 4/1989 | Fed. Rep. of Germany . |

Primary Examiner—Douglas D. Watts
Assistant Examiner—Allan M. Schrock
Attorney, Agent, or Firm—Lowe, Price, LeBlanc & Becker

[57] ABSTRACT

A cutter assembly of a strand cutting machine comprises a fixed cutter member, over which the strand is to be drawn after being cooled and dewatered, and a rotary cutter member coactive with said fixed cutter member to cut a strand of resin into pellets. The rotary cutter member includes i) a cylindrical rotary body having a forward side surface parallel to a supply-side end surface of the fixed cutter member, ii) a rotary shaft extending perpendicularly to the supply-side end surface of the fixed cutter member and supporting thereon the rotary body, and iii) a plurality of blades mounted on the rotary body in a forward inclined posture in the direction of rotation. The rotary body has a plurality of through-holes arranged at regular distances along a circle concentric with the rotary body, each through-hole extending between opposite surfaces. Each blade is attached to an inside surface 5a of the respective through-hole and has at its end a cutting edge.

9 Claims, 17 Drawing Sheets

F I G. 19
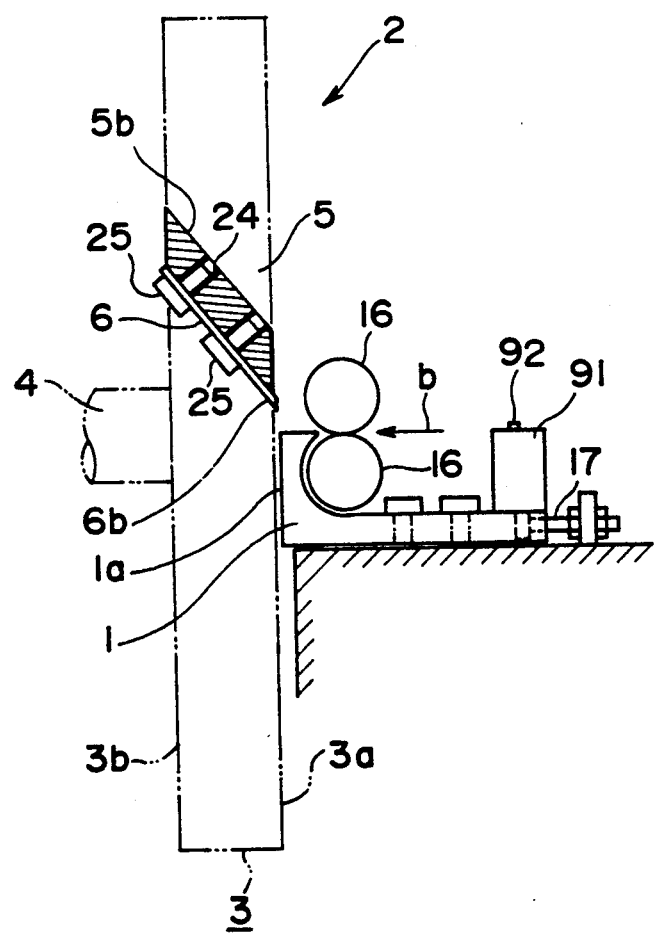

CUTTER ASSEMBLY FOR STRAND CUTTING MACHINE AND RESIN MATERIAL CUTTING ASSEMBLY

BACKGROUND OF THE INVENTION

1. Field of the Invention

This invention relates to a cutter assembly of a strand cutting machine in which a strand of resin is cut by a fixed cutter member and a rotary cutter member as the strand is supplied to the fixed cutter member. This invention relates also to a resin material cutting assembly.

2. Description of the Related Art

In a conventional strand cutting machine, a strand of cooled and dewatered resin is drawn over a fixed cutter member and is then cut into pellets as the fixed cutter member coacts with a rotary cutter member. As shown in FIG. 1 of the accompanying drawings, the rotary cutter member 2 is mounted on a rotary shaft 4 parallel to a supply-side end surface 1a of the fixed cutter member 1, and the rotary cutter member 2 has along its outer periphery a sawtoothed blade assembly with a plurality of cutting edges 2 each having an inner surface at an angle of about 20 degrees.

However, in such conventional technology, when a strand is cut by the rotary cutter member, the thus cut pellets can become jammed between the teeth of the sawtoothed blade assembly so that they get carried around, as the sawtoothed blade assembly makes a complete rotation, and hence are recut into smaller pellets which are not of standard size or they can be discharged from a portion other than a predetermined discharge position, thus making such portion dirty.

Further, with this conventional technology, when the blade is worn out, the whole rotary cutter member must be removed and polished, which is laborious and time-consuming; if it is polished repeatedly, the rotary cutter member must be exchanged with a new one, which is expensive.

Moreover, with this conventional technology, since a strand is cut by being smashed by the rotary cutter member, the cut ends of individual pellets have fine white splits, which gives them an unsightly appearance, so that the quality of pellets is lowered. Also, a considerably large sound is produced during cutting, thus causing noise pollution.

SUMMARY OF THE INVENTION

It is therefore an object of this invention to provide a cutter assembly of a strand cutting machine which can cut a strand of resin into neat, good-quality pellets of standard size without making nearby areas dirty and with less noise and which enables a reduction in the cost of polishing the blade of a rotary cutter member.

According to a first aspect of the invention, there is provided a cutter assembly of a strand cutting machine for cutting a strand of resin into pellets, comprising: a fixed cutter member over which the strand is to be supplied after being cooled and dewatered; and a rotary cutter member coacting with the fixed cutter member, the rotary cutter member including i) a cylindrical rotary body having a forward side surface parallel to a supply-side end surface of the fixed cutter member, ii) a rotary shaft extending perpendicularly to the supply-side end surface of the fixed cutter member and supporting thereon the rotary body, and iii) a plurality of blades mounted on the rotary body in a forward inclined posture in the direction of rotation, the rotary body having a plurality of through-holes arranged at regular distances along a circle concentric with the rotary body, each through-hole extending between opposite surfaces, each blade being attached to an inside surface 5a of the respective through-hole and having at its end a cutting edge.

Preferably, both front and rear inside surfaces, as viewed in the direction of rotation, of each through-hole may be inclined at an angle ($\alpha$) of 35 to 60 degrees with respect to the front surface of the rotary body.

Further, each blade may have on a side toward the cutting edge a V-shaped end assuming an angle ($\beta$) of 30 to 50 degrees and projecting beyond the forward surface of the rotary body.

Each blade may be adjustably mounted on the rotary body so as to be adjusted towards and away from the forward surface of the rotary body.

According to a second aspect of the invention, there is provided a resin material cutting assembly comprising: a fixed cutter member over which a resin material is to be supplied; and a rotary cutter member coacting with the fixed cutter member, the rotary cutter member including (i) a rotary shaft extending in the direction of feeding the resin material and supporting the rotary cutter member, and (ii) a plurality of blades arranged about the rotary shaft at fixed points, extending radially and slanting from the downstream side toward the upstream side in the direction of rotation, each blade having a cutting edge at its forward position toward the fixed cutter member in the direction of rotation.

Preferably, the rotary cutter member may include a central portion connected to the rotary shaft, and a ring portion disposed around the rotary shaft concentrically thereof, the central portion and the ring portion having on an outer surface and an inner surface, respectively, at their confronting positions a plurality of grooves, each slanting from the downstream side toward the upstream side in the direction of rotation, each blade being fitted at opposite ends in the corresponding grooves of the central portion and the ring portion.

With this cutter assembly of the invention, a strand of cooled and dewatered resin is supplied over the fixed cutter member whereupon the rotary cutter member is rotated on the rotary shaft with the side surface of the rotary cutter member being parallel to the supply-side end surface of the fixed cutter member. As a result, by the forwardly inclined blade of the rotary cutter member, the strand is cut into pellets smoothly so as to have a cut surface parallel to the plane of rotation of the rotary cutter member. Therefore, it is possible to cut a strand of even soft resin into pellets effectively and accurately so that the pellets can flow through a hole smoothly and can hence be discharged to a predetermined discharge position precisely and orderly.

With the cutter assembly for cutting resin material, strands of resin as well as other forms of resin such as soft sheets of polyvinyl chloride resin can be cut.

In the case where the individual blades are detachably mounted, when a part of the blades is worn out, it is only necessary to exchange the worn blade with a new one. Also when any blade is damaged such as by a piece of metal accidentally entering between the cutter members during cutting, only the worn blade needs to be exchanged with a new one.

BRIEF DESCRIPTION OF THE DRAWINGS

FIG. 19 is a fragmentary cross-sectional view showing a cutter assembly of a strand cutting machine according to a ninth embodiment.

DETAILED DESCRIPTION OF THE PREFERRED EMBODIMENTS

Various embodiments of this invention will now be described with reference to the accompanying drawings. FIGS. 1 through 6 show a cutter assembly of a strand cutting machine for a pellet manufacturing apparatus, according to a first embodiment.

Figure 2:
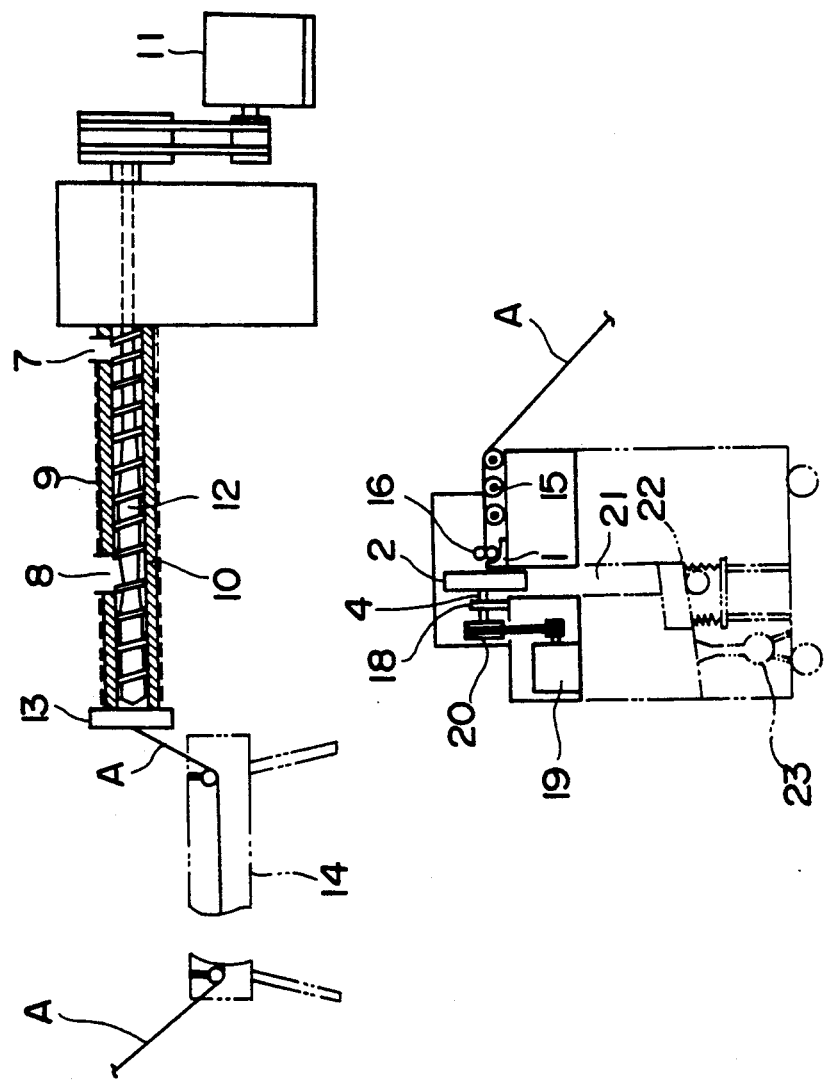
FIG. 2 is a side view showing a part of a pellet manufacturing apparatus according to the first embodiment.

As shown in FIG. 2, the pellet manufacturing apparatus includes an extruder having a screw 12 received in a cylinder 10 and adapted to be driven by a motor 11. The cylinder 10 has a feed hole 7 into which a starting material is to be introduced, a vent hole 8, a heater 9, etc.

The pellet manufacturing apparatus causes a strand A of resin in a melted form to flow from a die head 13 at the distal end of the extruder into a water tank 14 in order to cool the strand A whereupon the strand A drawn out from the water tank 14 is dewatered by a suction-type dewatering unit 15 and is then drawn over the upper surface of a fixed cutter member 1 (described below) by a pair of feed rollers 16.

The cutter assembly comprises the fixed cutter member 1 and a rotary cutter member 2 disposed in confronting relation thereto; the strand A of resin is taken from the upstream source over the fixed cutter member 1 and is then cut at a position downstream of the fixed cutter member 1 by the rotary cutter member 2 which is rotated about a rotary shaft 4.

The fixed cutter member 1 can be horizontally adjusted toward and away from the rotary cutter member 2 by an adjuster. The rotary shaft 4 is inserted perpendicularly to and centrally through the rotary cutter member 2 and is secured thereto, extending in the direction of travel of the strand A and being supported by a metal plate 18. Further, the rotary shaft 4 is operatively connected to a motor 19 via a continuous belt 20.

Under the rotary cutter member 2, a pellet fall passageway 21 is provided. Under the pellet fall passageway 21, a bellows 22 and an air blower 23 are provided.

Figure 3:
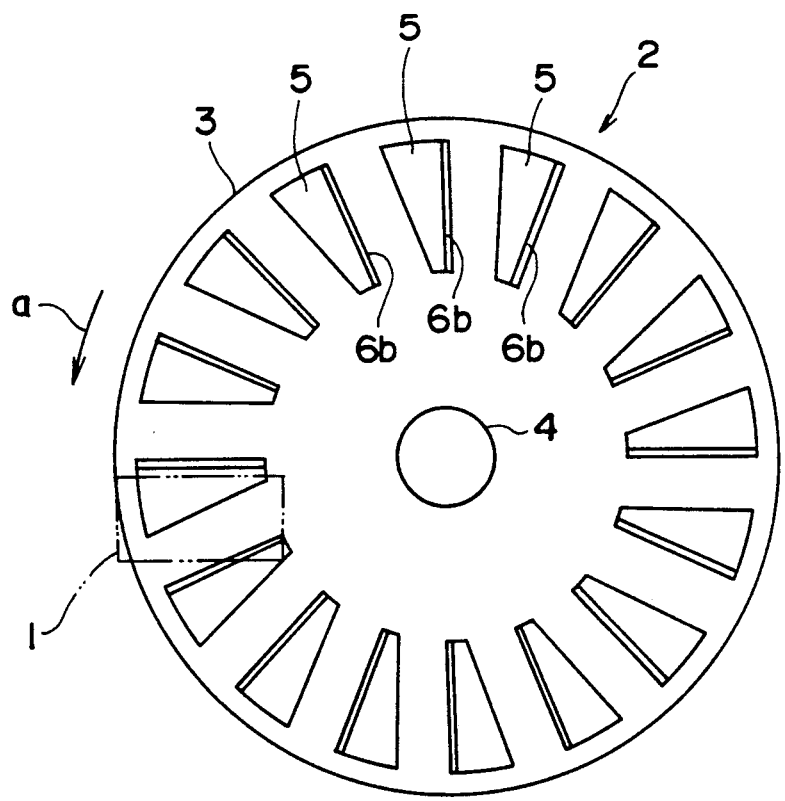
FIG. 3 is a front view showing a rotary cutter member according to the first embodiment.

As shown in FIG. 3, the rotary cutter member 3 includes a multiplicity of blades 6 attached on a cylindrical rotary body 3. The rotary body 3 is mounted on the rotary shaft 4 in such a manner that a forward side surface 3a of the rotary body 3 is parallel to the supply-side end surface 1a of the fixed cutter member 1. The rotary body 3 has a plurality of through-holes 5 at regular distances along a concentric circle, each through-hole 5 extending through the rotary body 3 between forward and rear side surfaces 3a, 3b thereof.

Figure 4:
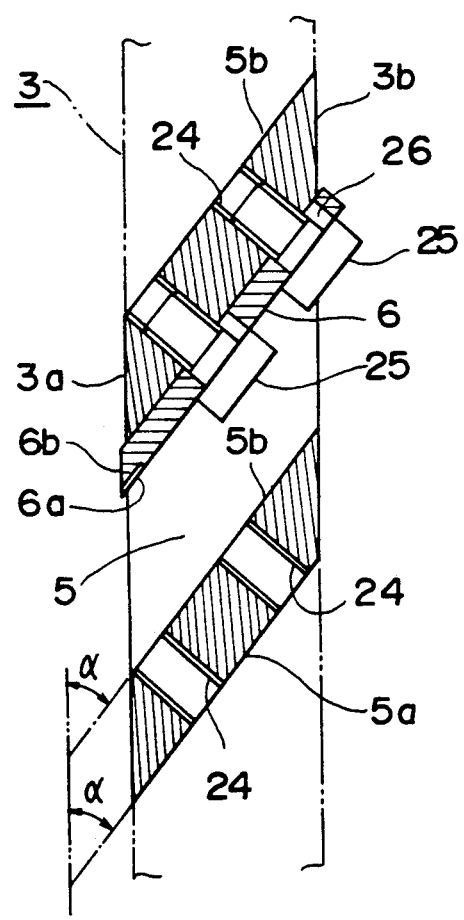
FIG. 4 is a cross-sectional view of a part of the rotary cutter member of FIG. 3.

As shown in FIG. 4, front and rear (in the direction of rotation) inside surfaces 5b, 5a of each through-hole 5 are forwardly inclined by an angle $\alpha$ of 35 to 60 degrees with respect to the front side surface 3a of the rotary body 3. The rotary body 3 also has four threaded holes 24 each extending from the inside surface 5a to the inside surface 5b.

Figure 6:
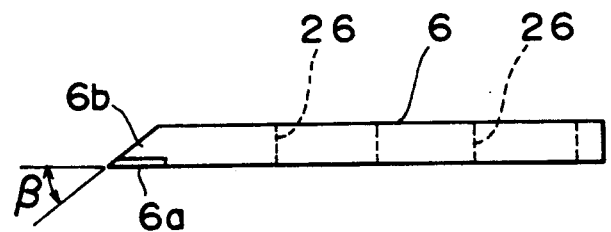
FIG. 6 is a side view of the blade of FIG. 5.

Each blade 6 extends radially from the center of the rotary body 3 and is forwardly inclined with respect to the inside surface 5a, thus slanting from the upstream side toward the downstream side in the direction of rotation. Each blade 6 has an end, i.e., a cutting edge 6a at a forward (in the direction of rotation) position toward the fixed cutter member 1. The angle $\beta$ of a V-shaped end 6b on the side of the cutting edge 6a is 30 to 50 degrees, as shown in FIG. 6.

Figure 5:
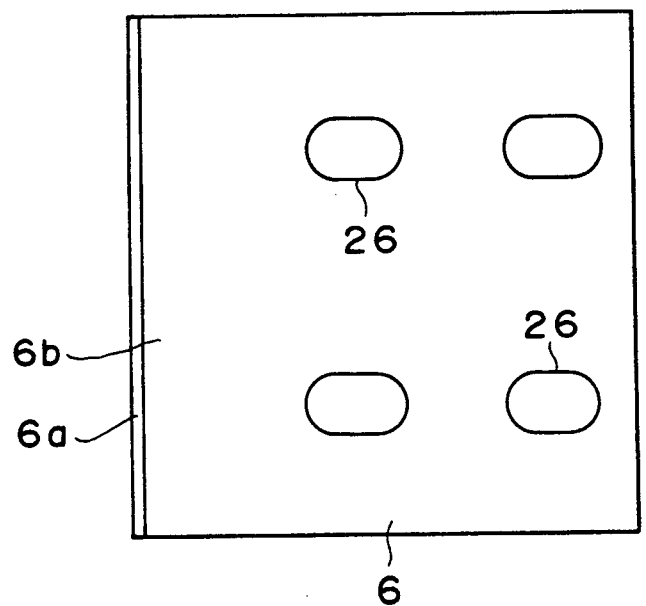
FIG. 5 is a plan view showing a blade according to the first embodiment.

As shown in FIG. 5, each blade 6 has four slots 26 through which a screw 25 is to be inserted. The blade 6 is adjustably attached to the inside surface 5a of the rotary body 3 in such a manner that its end 6b projects beyond the forward side surface 3a of the rotary body 3 and is adjustable with respect to the forward side surface 3a.

The operation of the strand cutting machine will now be described.

Figure 1:
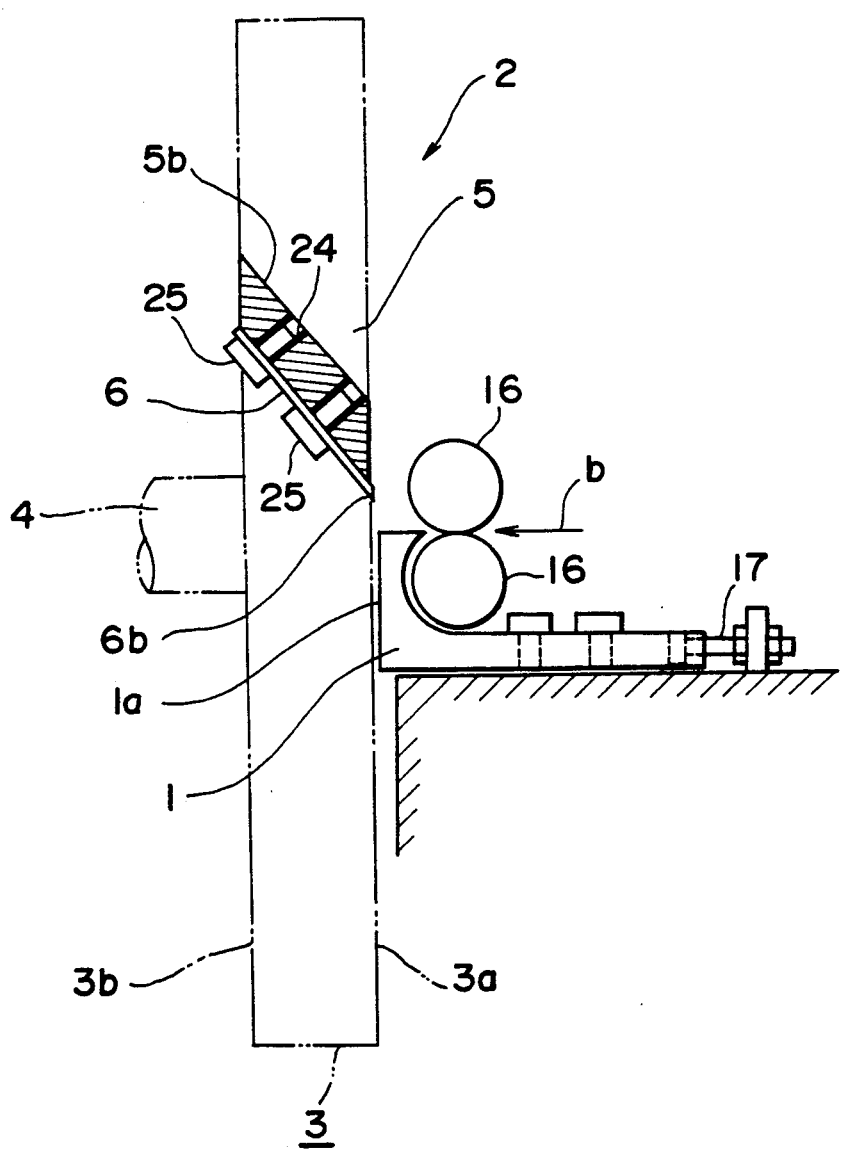
FIG. 1 is a fragmentary cross-sectional view showing a cutter assembly of a strand cutting machine according to a first embodiment of this invention.

In FIG. 1, while the rotary cutter member 2 is rotating in the direction of arrow a (FIG. 3), a strand A of resin or even soft resin cooled and dewatered is drawn in the direction of arrow b over the fixed cutter member 1 by the coacting feed rollers 16, 16. The rotary cutter member 2 is rotated about the rotary shaft 4 with the side surface 3a of the rotary body 3 in parallel to the supply-side end surface 1a of the fixed cutter member 1.

The strand A is cut into pellets smoothly, by the end 6b of the forwardly inclined individual blade 6 of the rotary body 3, and in such a manner that the cut surface is parallel to the plane of rotation. Therefore it is possible to cut a strand of even soft resin into pellets effectively and accurately so that the pellets can flow through the forwardly inclined through-hole 5 smoothly and hence can be discharged to a predetermined discharge position, i.e., the pallet fall passageway 21 underneath precisely and orderly.

Further, the lower limit of projection of the end 6b of the blade 6 can be adjusted by loosening the individual screws 25 and then moving the blade 6 forwards or backwards. If a part of the cutting edge is worn out, or if a part of the cutting edge 6a is broken by a metal piece accidentally entering between the two cutter members 1, 2, it is only necessary for the worn blade to be exchanged with a new one, thus saving labor and production costs.

Figure 7:
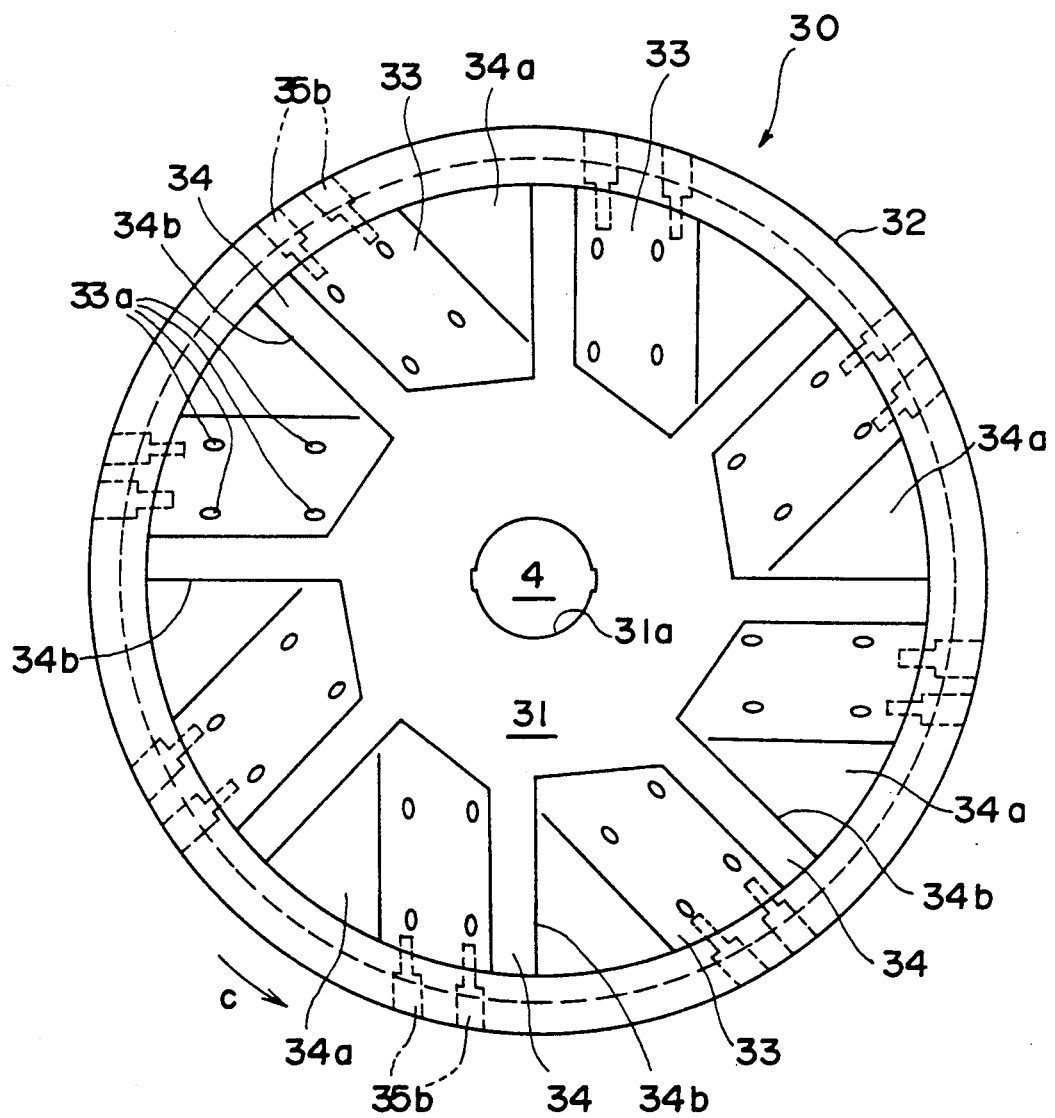
FIG. 7 is a front view of a rotary cutter member according to a second embodiment.
Figure 8:
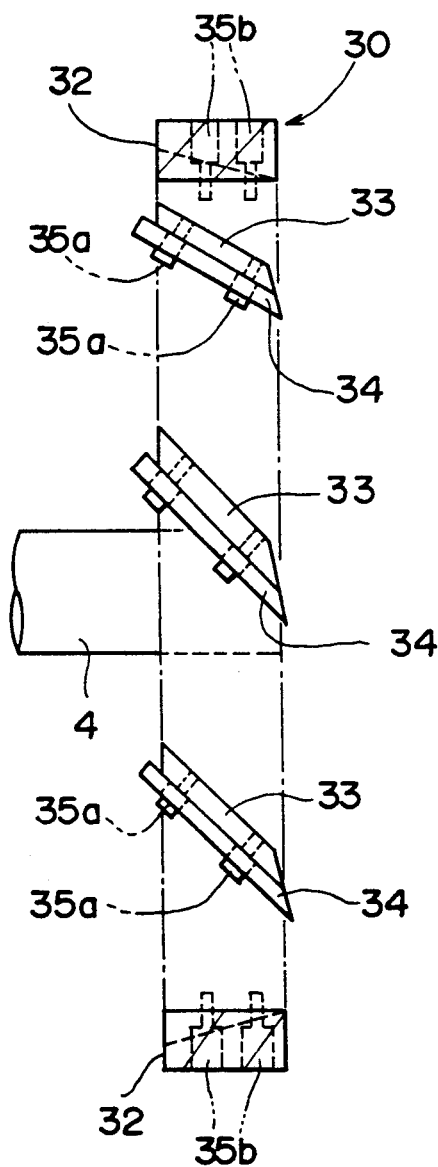
FIG. 8 is a cross-sectional view of the rotary cutter member of FIG. 7.

FIGS. 7 and 8 show a modified rotary cutter member 30 according to a second embodiment. Like reference numerals designate parts or elements similar to those of the first embodiment; any repetition of description is omitted here for clarity.

As shown in FIG. 7, the rotary cutter member 30 includes a central portion 31, a ring portion 32, a plurality of support portions 33, and a plurality of blades 34. The central portion 31 is made up of a disk fixed perpendicularly to a rotary shaft 4 of the rotary cutter member 30 at a central hole 31a. The ring portion 32 is concentric with the central portion 31 and is spaced radially therefrom.

Each blade 34 is made integral with the central portion 31, extending radially from the central portion 31 to the ring portion 32. Each blade 34 is fastened to the ring portion 32 by two screws 35b, connecting the ring portion 32 with the central portion 31. As shown in FIG. 8, each blade 34 is placed over and secured to the respective support portion 33 by four screws 35a extending through four slots 34a.

Each support portion 33 and the respective blade 34 defines therebetween a through-hole 34a on the forward side in the direction of rotation, as indicated by arrow c in FIG. 7, and is located between the central portion 31 and the ring portion 32. Each blade 34 slants from its rear surface to its front surface in the direction of rotation, having a cutting edge 34b on the forward position (in the direction of rotation) toward the fixed cutter member 1.

Figure 9:
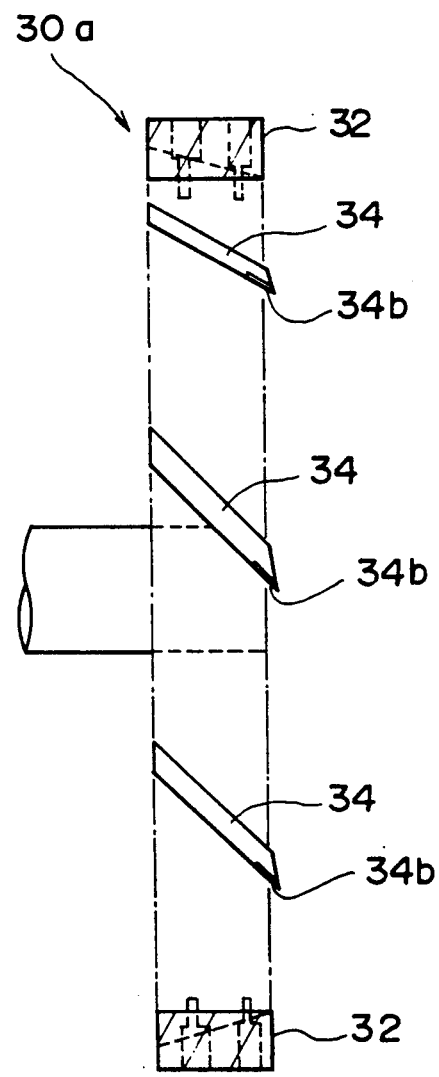
FIG. 9 is a cross-sectional view showing a rotary cutter member according to a third embodiment.

FIG. 9 shows a third embodiment in which the individual blade 34 is attached in a different way. Like reference numerals designate parts or elements similar to those of the second embodiment; any repetition of description is omitted here for clarity.

As shown in FIG. 9, each cutting edge 34b of the rotary cutter member 30a is fixed to the respective blade 34 by welding. Each cutting edge 34b is made of an ultrahard alloy.

Figure 10:
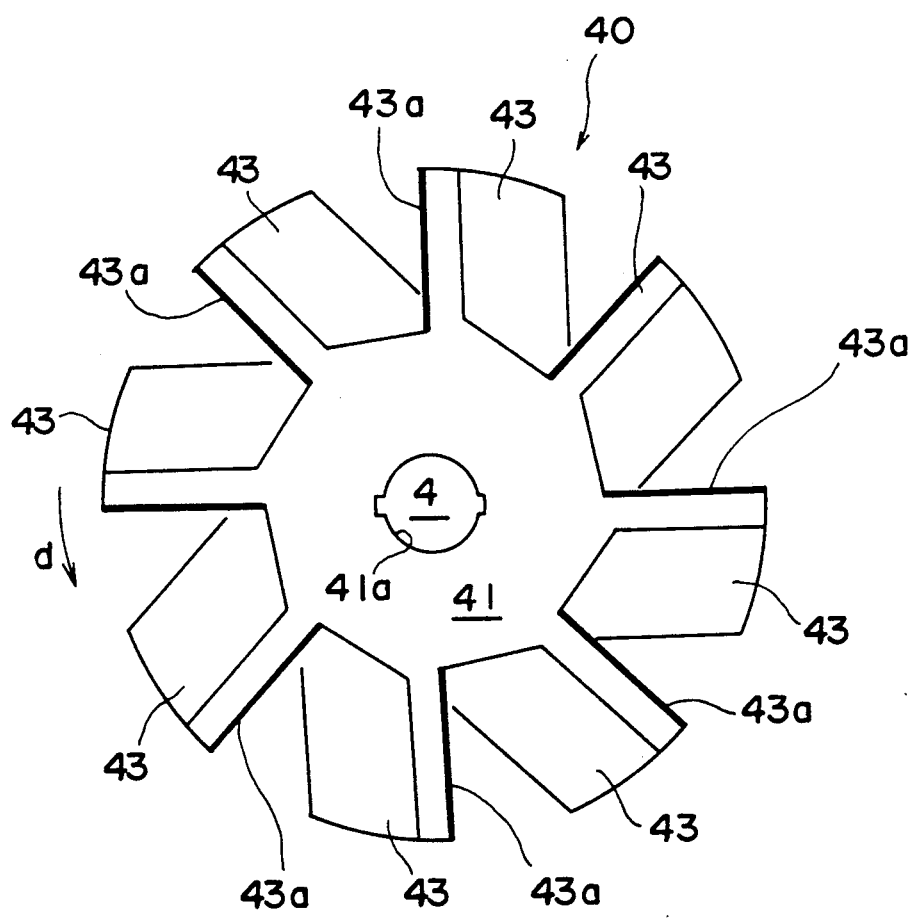
FIG. 10 is a front view showing a rotary cutter member according to a fourth embodiment.
Figure 11:
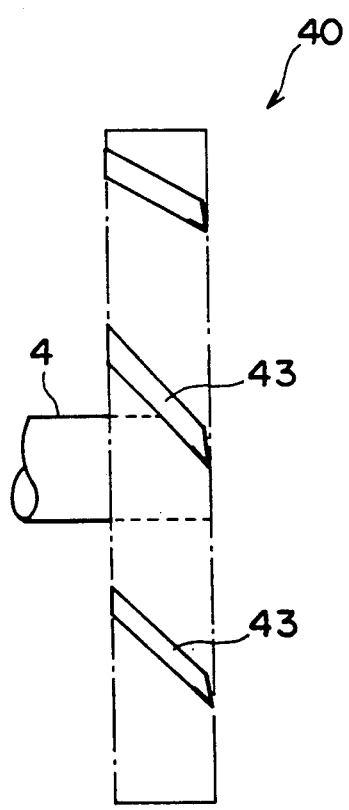
FIG. 11 is a cross-sectional view of the rotary cutter member of FIG. 10.

FIGS. 10 and 11 show another modified rotary cutter member 40 according to a fourth embodiment. Like reference numerals designate parts or elements similar to those of the first embodiment; any repetition of description is omitted here for clarity.

As shown in FIG. 10, the rotary cutter member 40 includes a central portion 41 and a plurality of blades 43. The central portion 41 is fixed perpendicularly to a rotary shaft 4 of the rotary cutter member 40, the rotary shaft 4 being inserted through a central hole 41a of the central portion 41. Each blade 43 is integral with the central portion 41, extending radially from the central portion 41. The individual blades 43 are arranged at regular spaces in the direction of rotation.

As shown in FIG. 11, each blade 43 slants from its rear surface to its forward surface in the direction of rotation as indicated by an arrow d, having a cutting edge 43a at the forward position toward the fixed cutter member 1 in the direction of rotation. Each cutting edge 43a is fixed to the respective blade 43 by welding.

Figure 12:
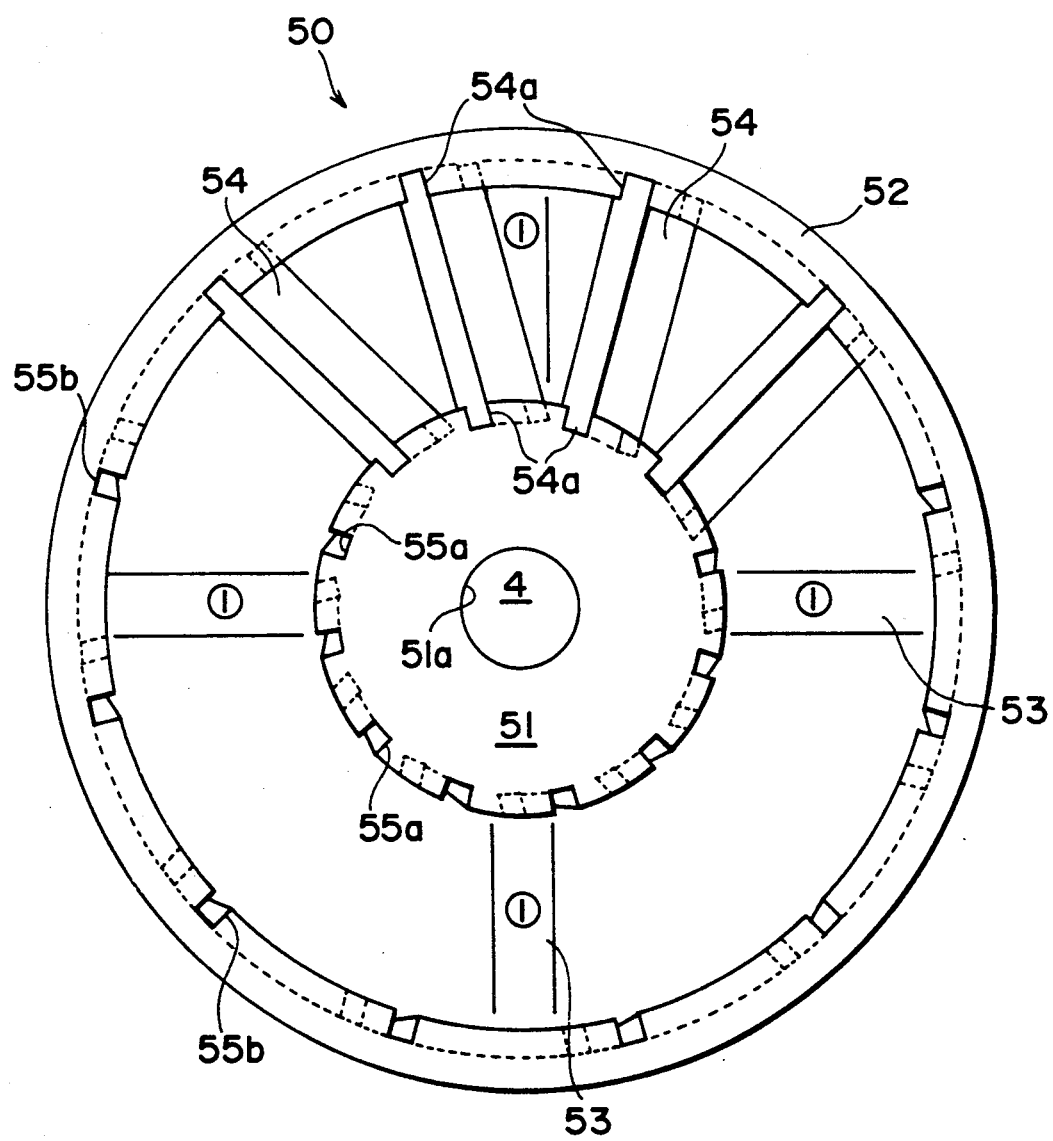
FIG. 12 is a front view showing a rotary cutter member according to a fifth embodiment.
Figure 13:
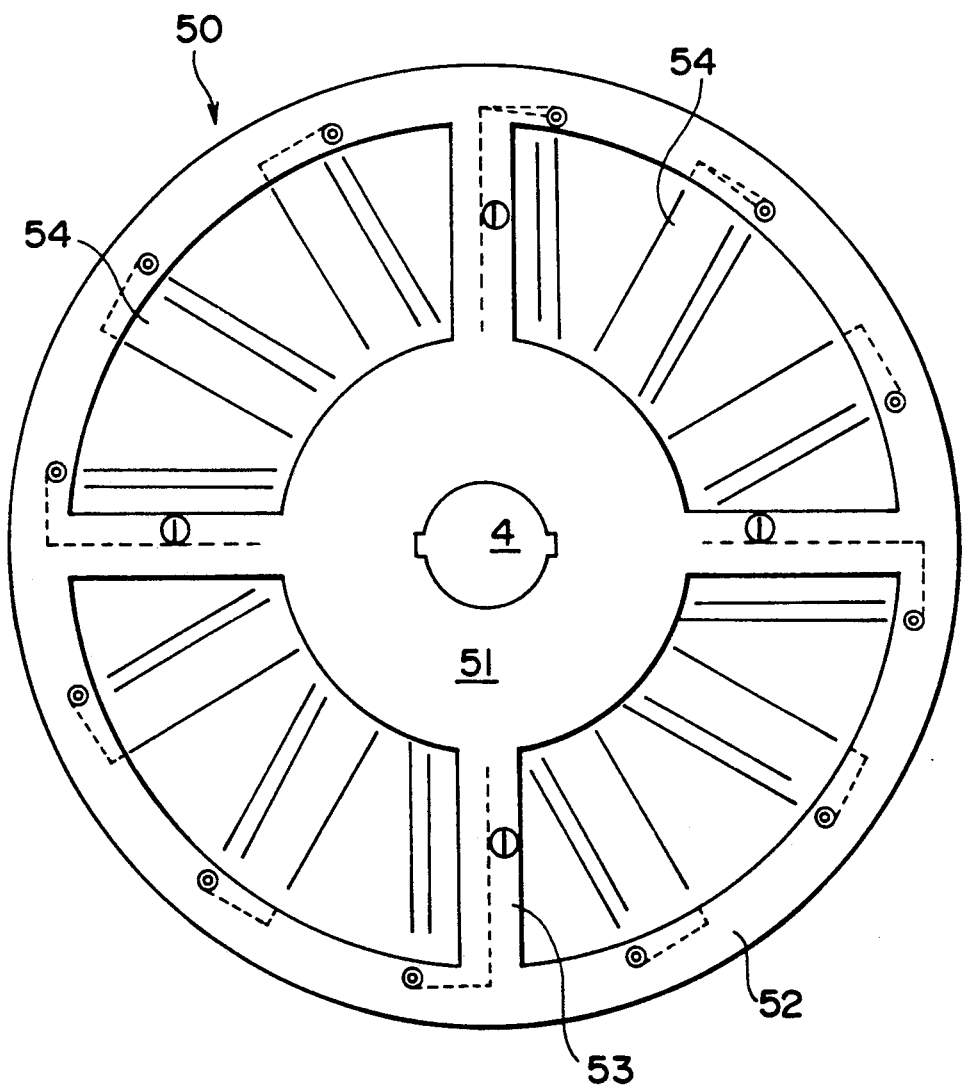
FIG. 13 is a rear view of the rotary cutter member of FIG. 12.
Figure 14:
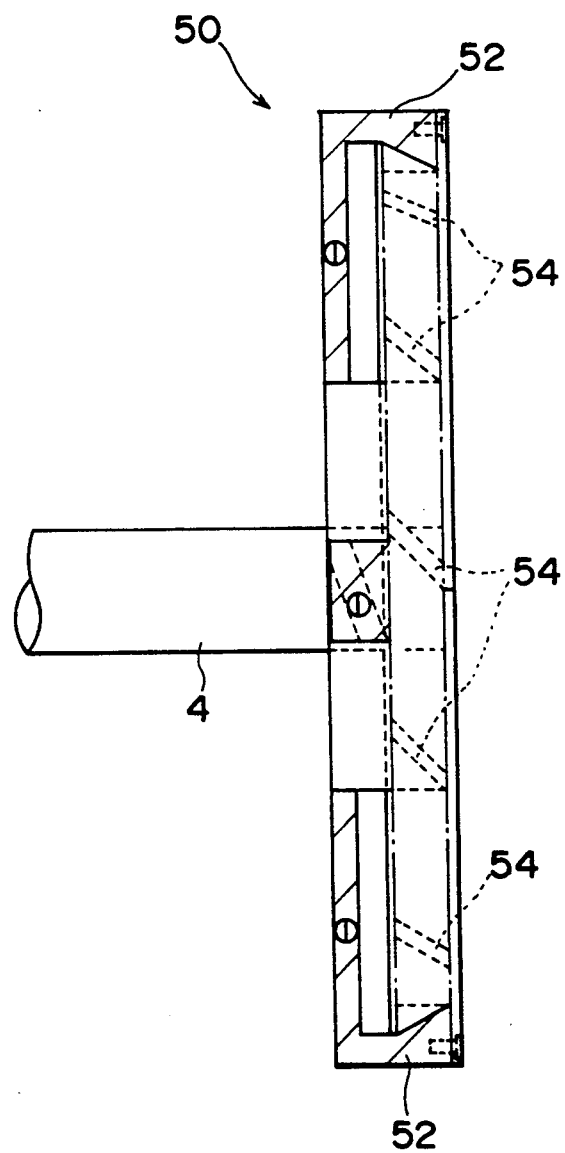
FIG. 14 is a cross-sectional view of the rotary cutter member of FIG. 12.

FIGS. 12 through 14 show still another modified rotary cutter member 50 according to a fifth embodiment. Like reference numerals designate parts or elements similar to those of the first embodiment; any repetition of description is omitted here for clarity.

As shown in FIGS. 12 through 14, the rotary cutter member 50 includes a central portion 51, a ring portion 52, a plurality of support portions 53 and a plurality of blades 54. The central portion 51 is fixed perpendicularly to a rotary shaft 4 of the rotary cutter member 50, the rotary shaft 4 being inserted through a central hole 51a of the central portion 51. The ring portion 52 is concentric with the central portion 51 and is spaced radially therefrom. Each support portion 53 is integral with both the central portion 51 and the ring portion 52 and extends radially therebetween, connecting the central portion 51 with the ring portion 52.

The outer surface of the central portion 51 and the inner surface of the ring portion 52 have at their confronting positions a plurality of grooves 55a, 55b slanting from the downstream side to the upstream side in the direction of rotation. Each blade 54 is at either end 54a fitted in to the corresponding grooves 55a, 55b of the central portion 51 and the ring portion 52, respectively.

Figure 15:
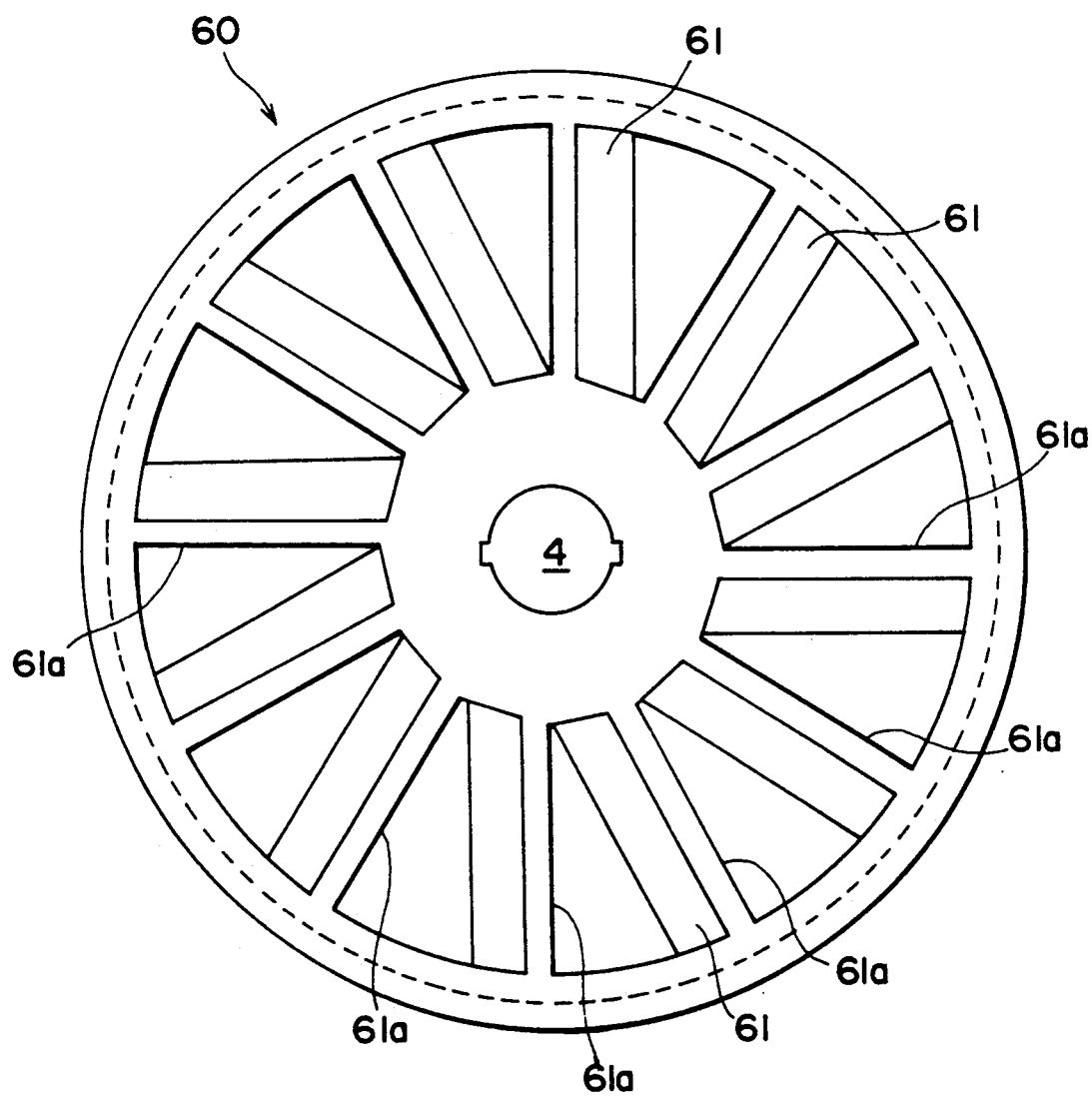
FIG. 15 is a front view showing a rotary cutter member according to a sixth embodiment.
Figure 16:
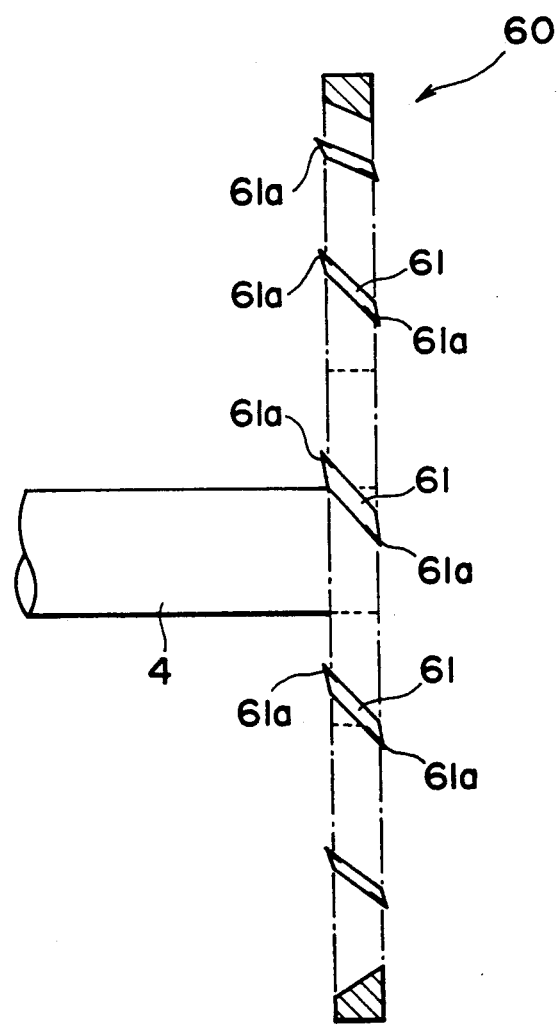
FIG. 16 is a cross-sectional view of the rotary cutter member of FIG. 15.

FIGS. 15 and 16 show a further modified rotary cutter member 60 according to a sixth embodiment. Like reference numerals designate parts or elements similar to those of the first embodiment; any repetition of description is omittted here for clarity.

As shown in FIG. 15, the rotary cutter member 60 is a monoblock casting with opposite surfaces in symmetry. Each blade 61 has a pair of cutting edges 61a one on each side of the blade 61 so that when the rotary cutter member 60 is mounted on the rotary shaft 4 in an inverted posture, one of the cutting edges 61a is located at the forward position toward the fixed cutter member 1 in the direction of rotation.

Figure 17:
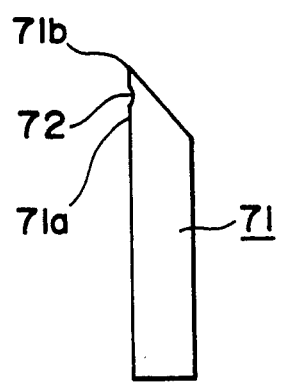
FIG. 17 is a side view showing a blade according to a seventh embodiment.

FIG. 17 shows a modified blade 71 according to a seventh embodiment. Like reference numerals designate parts or elements similar to those of the first embodiment; any repetition of description is omitted here for clarity.

As shown in FIG. 17, the blade 71 has a groove 72 in a cutting edge 71a. The groove 72 has an arcuate surface and extends parallel to the cutting portion 71b, serving to assist in removing cut material from the blade 71.

Figure 18:
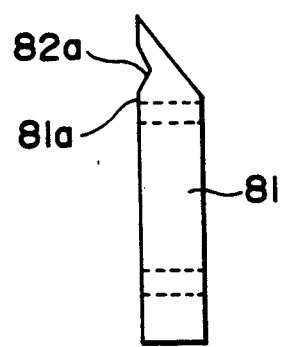
FIG. 18 is a side view showing a blade according to an eighth embodiment.

FIG. 18 shows another modified blade 81 according to an eighth embodiment. Like reference numerals designate parts or elements similar to those of the first embodiment; any repetition of description is omitted here for clarity.

As shown in FIG. 18, the blade 81 has in a cutting edge 81a a groove 82 of V-shaped cross section.

Figure 20:
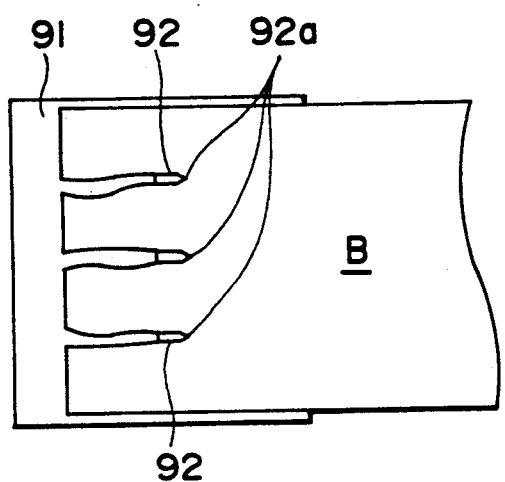
FIG. 20 is a side view showing a conventional rotary cutter member.
Figure 21:
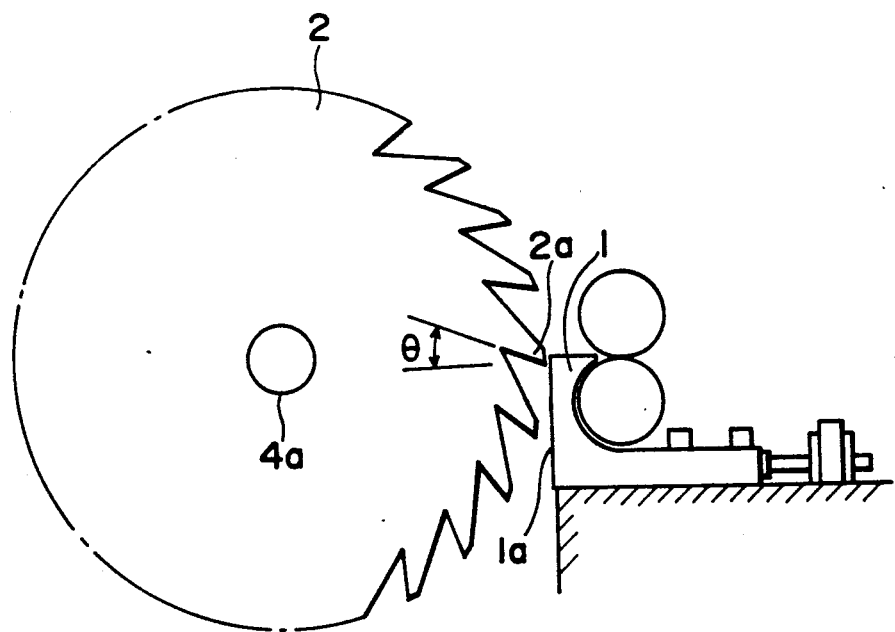
FIG. 21 is a side elevation view of a conventional rotary cutter member.

FIGS. 19 and 20 show a resin material supply unit according to a ninth embodiment. Like reference numerals designate parts or elements similar to those of the first embodiment; any repetition of description is omitted here for clarity.

As shown in FIG. 19, upstream of the coacting feed rollers 16, 16 and at a midpoint in the supply of resin material B to the fixed cutter member 1, a feed block 91 is located. As shown in FIG. 20, the feed block 91 has on its upper surface a plurality of cutting portions 92. The cutting portions 92 are arranged spaced apart and have ripping edges 91a on and along the upstream side in the direction of the supply of resin material B.

This embodiment is suitable for cutting resin material B such as a continuous length of scrap sheet of polyvinyl chloride. As shown in FIG. 20, when it is fed on the feed on the block 91 to the downstream side, the resin material B is shredded in the feed direction by the cutting portions 92, whereupon the individually ripped strips of resin material B are further cut by the fixed cutter member 1 and the rotary cutter member 2.

In each of the foregoing embodiments, the number of blades of the rotary cutter member should by no means be limited to the illustrated examples and may be any other number which is more than one.

With the cutter assembly and the resin material cutting assembly according to this invention, since the resin material is cut smoothly so as to have a cut surface parallel to the plane of rotation, the resin material can be cut into good-quality neat pellets of standard size without making nearby areas dirty and with less noise. In the case that the individual blades are adjustably attached, it is possible to displace the cutting portion from the wearing position, thus reducing the cost of polishing the blades of the rotary cutter member.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. A resin material cutting assembly, comprising:
   (a) a fixed cutter member over which a resin material is to be supplied; and
   (b) a rotary cutter member coacting with said fixed cutter member, said rotary cutter member including a rotary shaft extending in the feed direction of the resin material and supporting said rotary cutter member and a plurality of blades arranged about said rotary shaft to be spaced apart and extending radially and disposed in a forward inclined posture in the direction of rotation, each said blade having a cutting edge at its forward position toward said fixed cutter member in the direction of rotation,
   wherein said rotary cutter member includes a central portion connected to said rotary shaft, and a ring portion disposed around said rotary shaft concentrically thereof, an outer surface of said central portion and a confronting inner surface of said ring portion each having a corresponding plurality of grooves each disposed in a forward inclined posture in the direction of rotation, each said blade being fitted at opposite ends in corresponding grooves of said central portion and said ring portion.

2. A resin material cutting assembly according to claim 1, wherein:
   each said cutting edge is attached to the respective blade by welding.

3. A resin material cutting assembly according to claim 1, further comprising:
   precutting means for precutting said resin material, said resin material initially being in the form of a continuous length of sheet, said precutting means being located at a midpoint in the supply of said resin material from the upstream side toward said fixed cutter member and having at least one ripping edge on and along the upstream side in the direction of supply of said resin material.

4. A resin material cutting assembly according to claim 2, further comprising:
   precutting means for precutting said resin material, said resin material initially being in the form of a continuous length of sheet, said precutting means being located at a midpoint in the supply of said resin material from the upstream side toward said fixed cutter member and having at least one ripping edge on and along the upstream side in the direction of supply of said resin material.

5. A resin material cutting assembly according to claim 1, wherein:
   each blade is formed to have a plurality of slots and is adjustably mounted by screw means passed therethrough to screw into said rotary body.

6. A resin material cutting assembly according to claim 1, wherein:
   each blade has a groove in a cutting edge, said groove having an arcuate surface and extending parallel to a cutting portion of said edge to facilitate removal of cut strand material from the blade.

7. A resin material cutting assembly, comprising:
   (a) a fixed cutter member over which a resin material is to be supplied; and
   (b) a rotary cutter member coacting with said fixed cutter member, said rotary cutter member including a rotary shaft extending in the field direction of the resin material and supporting said rotary cuter member and a plurality of blades arranged about said rotary shaft to be spaced apart and extending radially and disposed in a forward inclined posture in the direction of rotation, each said blade having a cutting edge at its forward position toward said fixed cutter member in the direction of rotation,
   wherein said rotary cutter member is a monoblock casting with opposite surfaces in symmetry, each said blade having a pair of cutting edges on each side in such a manner that even when said rotary cutter member is mounted on said rotary shaft in an inverted posture, one of aid cutting edges is located at a position toward said fixed cutter member in the direction of rotation.

8. A resin material cutting assembly according to claim 7, further comprising:
   precutting means for precutting said resin material, said resin material initially being in the form of a continuous length of sheet, said precutting means being located at a midpoint in the supply of said resin material from the upstream side toward said fixed cutter member and having at least one ripping edge on and along the upstream side in the direction of supply of said resin material.

9. A resin material cutting assembly according to claim 7, wherein:
   each blade has a groove in a cutting edge, said groove having an arcuate surface and extending parallel to a cutting portion of said edge to facilitate removal of cut strand material from the blade.

* * * * *